Figure 1:
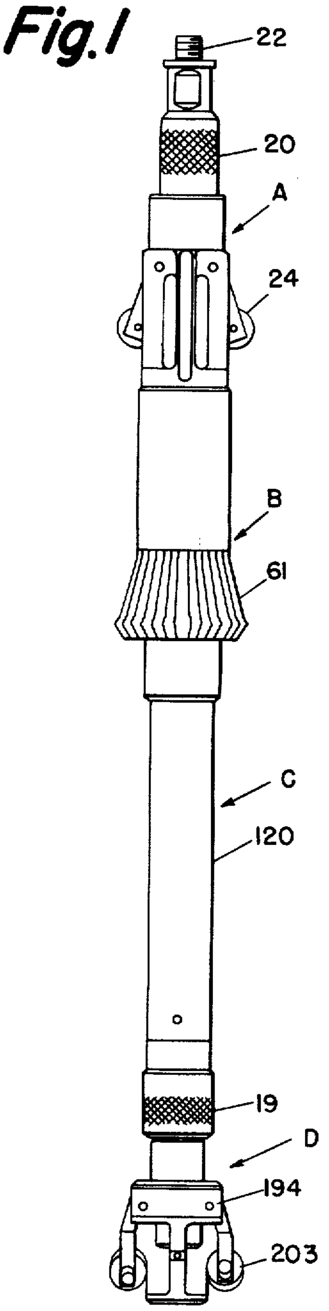

May 17, 1955 | J. V. FREDD | 2,708,316

TUBING CALIPER

Filed July 2, 1951 | 6 Sheets-Sheet 1

*INVENTOR.*
JOHN V. FREDD
*BY*
Busser and Harding
ATTORNEYS

May 17, 1955 J. V. FREDD 2,708,316

TUBING CALIPER

Filed July 2, 1951 6 Sheets-Sheet 2

INVENTOR.
JOHN V. FREDD

BY Busser and Harding

ATTORNEYS

May 17, 1955 J. V. FREDD 2,708,316

TUBING CALIPER

Filed July 2, 1951 6 Sheets-Sheet 3

INVENTOR.
JOHN V. FREDD

BY Busser and Harding

ATTORNEYS

May 17, 1955 J. V. FREDD 2,708,316

TUBING CALIPER

Filed July 2, 1951 6 Sheets-Sheet 4

INVENTOR.
JOHN V. FREDD

BY Busser and Harding

ATTORNEYS

May 17, 1955 J. V. FREDD 2,708,316

TUBING CALIPER

Filed July 2, 1951 6 Sheets-Sheet 5

INVENTOR.
JOHN V. FREDD

BY Busser and Harding

ATTORNEYS

INVENTOR.
JOHN V. FREDD
BY Busser and Harding
ATTORNEYS

United States Patent Office 2,708,316

Patented May 17, 1955

1

2,708,316

TUBING CALIPER

John V. Fredd, Dallas, Tex., assignor to Otis Pressure Control, Inc., Dallas, Tex., a corporation of Delaware Application July 2, 1951, Serial No. 234,714

36 Claims. (Cl. 33—178)

The present invention relates to tube calipering devices in general and particularly to those which are mechanically operated and self contained.

Tubing and casing commonly used in oil and gas well production are constantly subjected to corrosive actions which will, in time, cause pits and depressions in the internal surface of the tubing. As these weakened areas become larger, they will seriously affect the usefulness of the tubing. Under normal operating conditions these conduits are subjected to high pressures, as in oil well drilling operations, and it becomes important to replace badly corroded sections before the tubing or casing is so weakened that the pressure will rupture it.

The present invention, generally, is an improvement of the invention disclosed in the Chaney and Barnes Patent Number 2,518,663. That patent is directed to a tube calipering and recording mechanism adapted to be lowered within tubing or casing to locate, measure, and record such pits and depressions.

The Chaney-Barnes caliper just referred to represents a marked departure from the prior art in that it is especially designed to measure and record only the maximum radius of a plurality of calipered radii, "felt" or "sensed" by a plurality of independently operating calipering feelers at spaced circumferential points or locations at an instant during calipering passage.

It will be recognized that devices of this kind are precision instruments and are, consequently, expensive to produce. The device as disclosed in the aforementioned patent functions satisfactorily for its intended purpose but can be used only in tubing or casing of substantially the specific diameter for which it is manufactured. One instrument of this device cannot be adjusted to caliper and record the internal surface configurations of tubing or casing of materially different diameters. Accordingly, it is necessary to construct a tube calipering and recording device for each specific diameter of tubing or casing calipered. Gas and oil well tubing and casing commonly encountered in service presently varies in external diameters from approximately 1¼ inches to 8⅝ inches with intermediate sizes therebetween depending upon the operation and depth of the producing strata. It has been necessary in the past, therefore, to have five or more different calipering and recording devices of this type, one for each diameter tubing. Obviously, there would be great saving in investment if a single device incorporating the basic principles of the Chaney-Barnes invention could be made adjustable to measure and record accurateby the internal surface configurations of different diameters of tubing or casing normally used in oil and gas production.

Accordingly, an important object of the present invention is to produce a self-contained mechanically operated device capable of accurately calipering and recording the internal surface configurations of different diameter tubing or casing.

It is a further object of the invention to provide an adjustable device capable of accurately calipering and

2 recording the internal surface configurations of different diameter tubing wherein the centering and loading wheels, and calipering feelers, may be simultaneously adjusted diametrically of the housing in direct proportion to each other.

A further object of the invention is to provide accurate recording of the feeler movement, regardless of the diameter of the tubing, and to so proportion and transmit the movement of the feelers to the recording mechanism in a predetermined selected ratio to secure a clear and accurate record of the interior configuration.

It is a further object of the invention to provide a movement transmitting mechanism of increased sensitivity between the feelers and the recording means resulting in a more accurate recording of the feeler movement.

A still further object of this invention is to provide for adjustment of the driving means for the recording mechanism whereby a variety of predetermined speeds may be selected in order to obtain the best chart record relative to the length of tubing traversed during the calipering operation.

In accordance with the present invention, the caliper housing is constructed to pass freely through the smallest diametered casing in which it will be used. This housing of appropriate diameter is arranged to enclose and support all the necessary mechanism for the complete calipering and recording operation. The elements forming the present invention in association with the housing include a driving head to operate a recording mechanism and peripherally spaced loading wheels to center and maintain the housing in alignment as it passes through the casing during the calipering operation. A plurality of feelers, mounted circumferentially on the housing as the exploratory members, are adjusted for different diameter casings to assume a slightly retracted position during the non-calipering movement of the device, by the regulation of a positioning means common to the loading wheels and the feelers alike. Controlling the extension of the feelers from this non-calipering position as a part of the positioning elements is a release mechanism which operates to place the feelers in contact with the inner wall of the casing at the beginning of the calipering operation. At any one instant of the calipering operation, the movement of the most extended feeler is transmitted to a member, common to all of the feelers, suspended in the housing for activation of the recording mechanism. This member is light in weight to increase sensitivity for immediate response to the least movement of the feelers.

As an operating requirement, it will be understood that the feelers must project far enough from the body of the caliper to contact the largest diameter tubing or casing for which the device is intended. The physical size of the portions of the feelers directly operating the recording mechanism is limited by the dimensions of the caliper body. Further, the different diameters within which the device is designed to operate require that the feeler motion transmitting member proportion the feeler movement to the recording means in order to obtain a legible and accurate chart record. Means, in the form of a stylus rod assembly to meet this requirement, is provided which will amplify or reduce the feeler movement as it is transmitted to the chart record. The recording mechanism used to make this record contains a chart and stylus arranged to rotate in coordinated movement as well as respond to the feeler movement and thus scribe a calipering record for the length of casing traversed.

The motion for rotating the stylus and chart is furnished by a revolving friction head mounted on the housing which rotates as the housing is moved through the casing being calipered. A ratchet assembly is interposed between the drive element and the gears which drive the stylus and chart thereby restricting the rotary motion to one direction only. It will be recognized that such control permits the calipering operation to take place as the instrument is moved in only one direction. Thus, the chart reflects only the intended calipering operation and this may be repeated as often as desired within the limits of the chart area. A safety feature, usually termed a disconnect device is also incorporated between the drive mechanism and the gears mentioned to protect the sensitive chart and stylus members from strain or damage at the end of the chart run.

A transmission is inserted between the driving head and the ratchet sub-assembly to give greater flexibility to the device in its multiple calipering use. Interchangeable gears and pinions are devised so that the ratio of feet of tubing calipered to inches recorded on the chart may be pre-selected. A wide variety of records is thus made available to serve not only the diameter and total length of the casing calipered but also the conditions under which the record is made.

Figures 2, 2A:
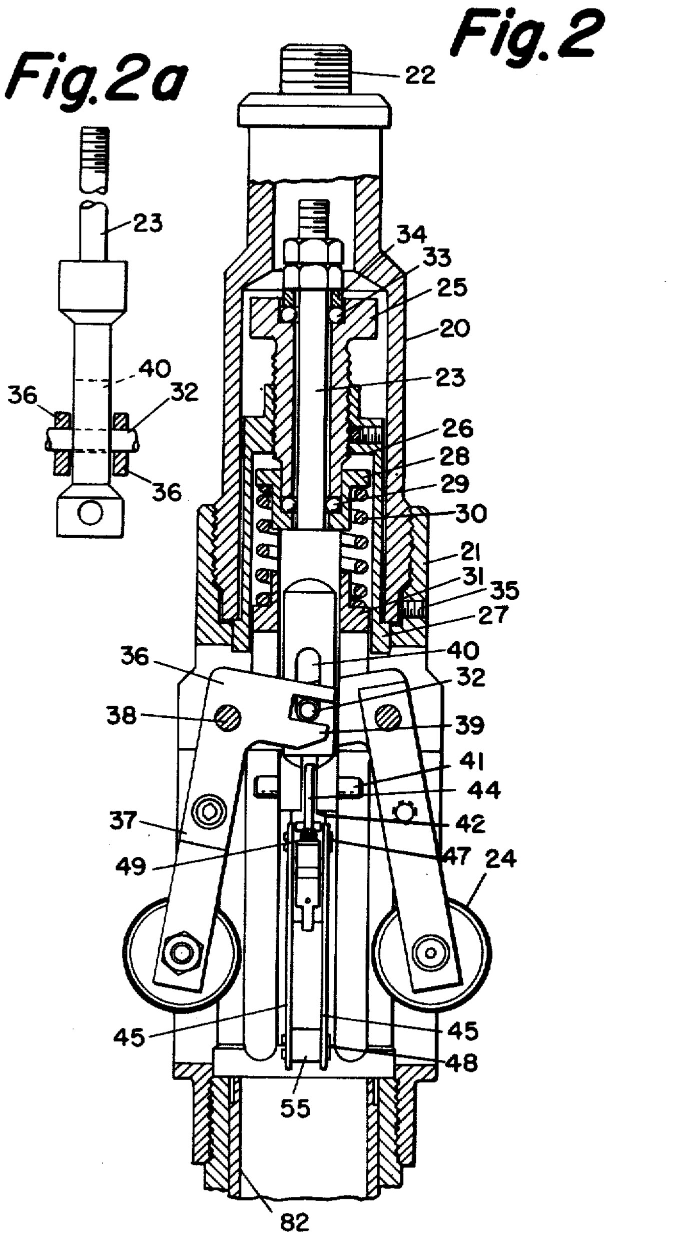
Figure 3:
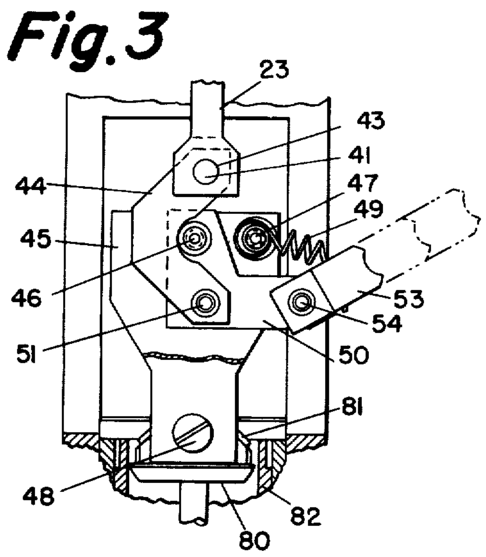
Figure 4:
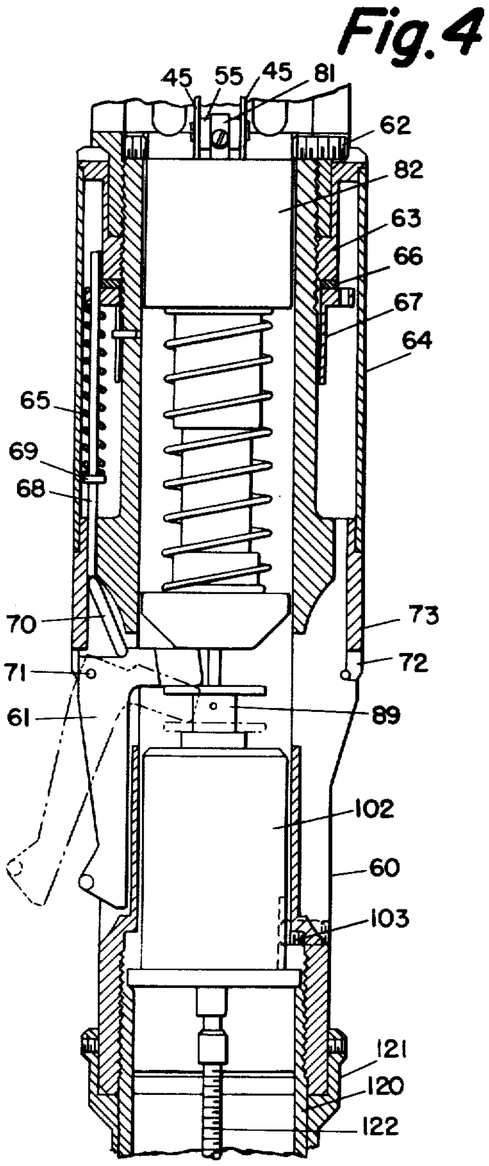
Figure 5:
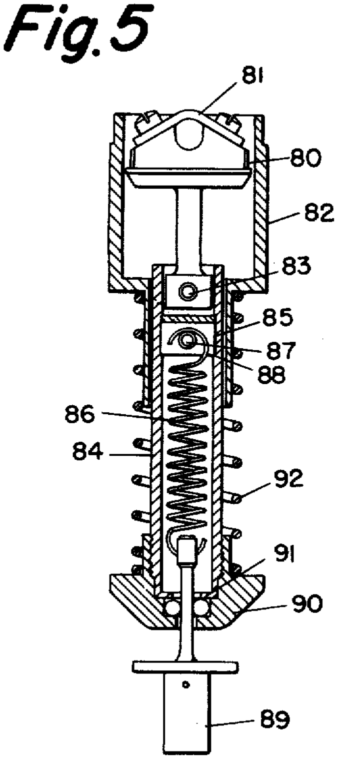
Figure 6:
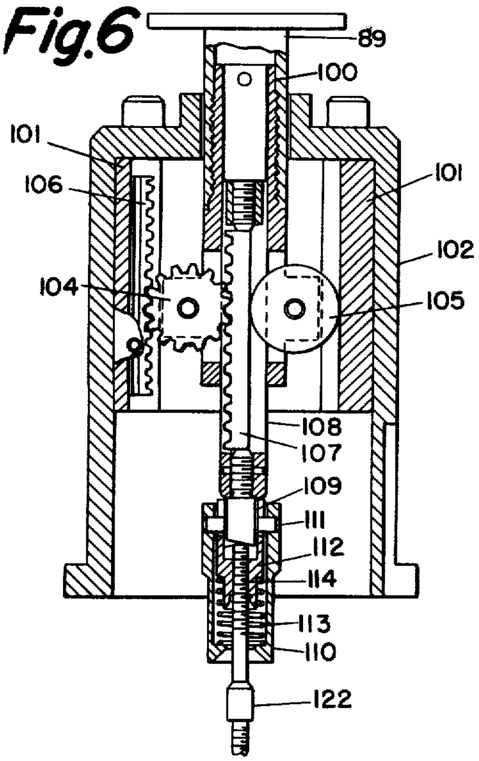
Figure 7:
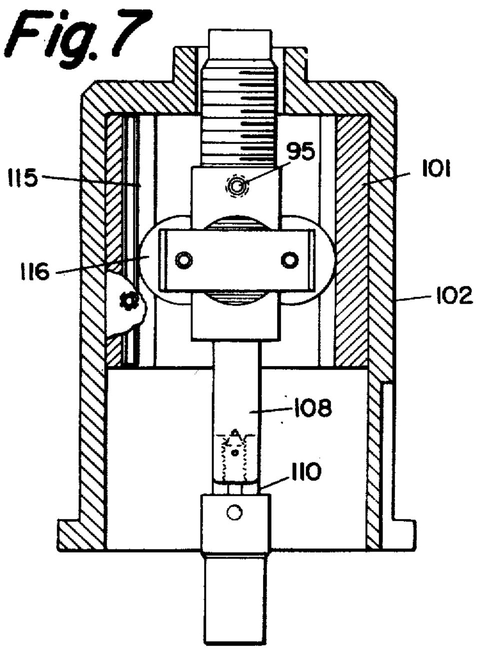
Figure 8:
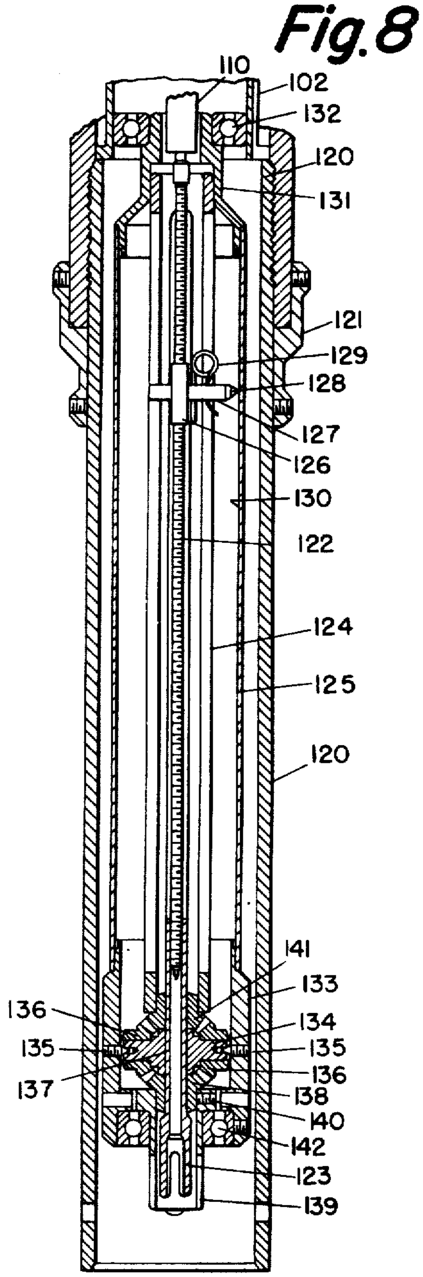
Figures 9, 10:
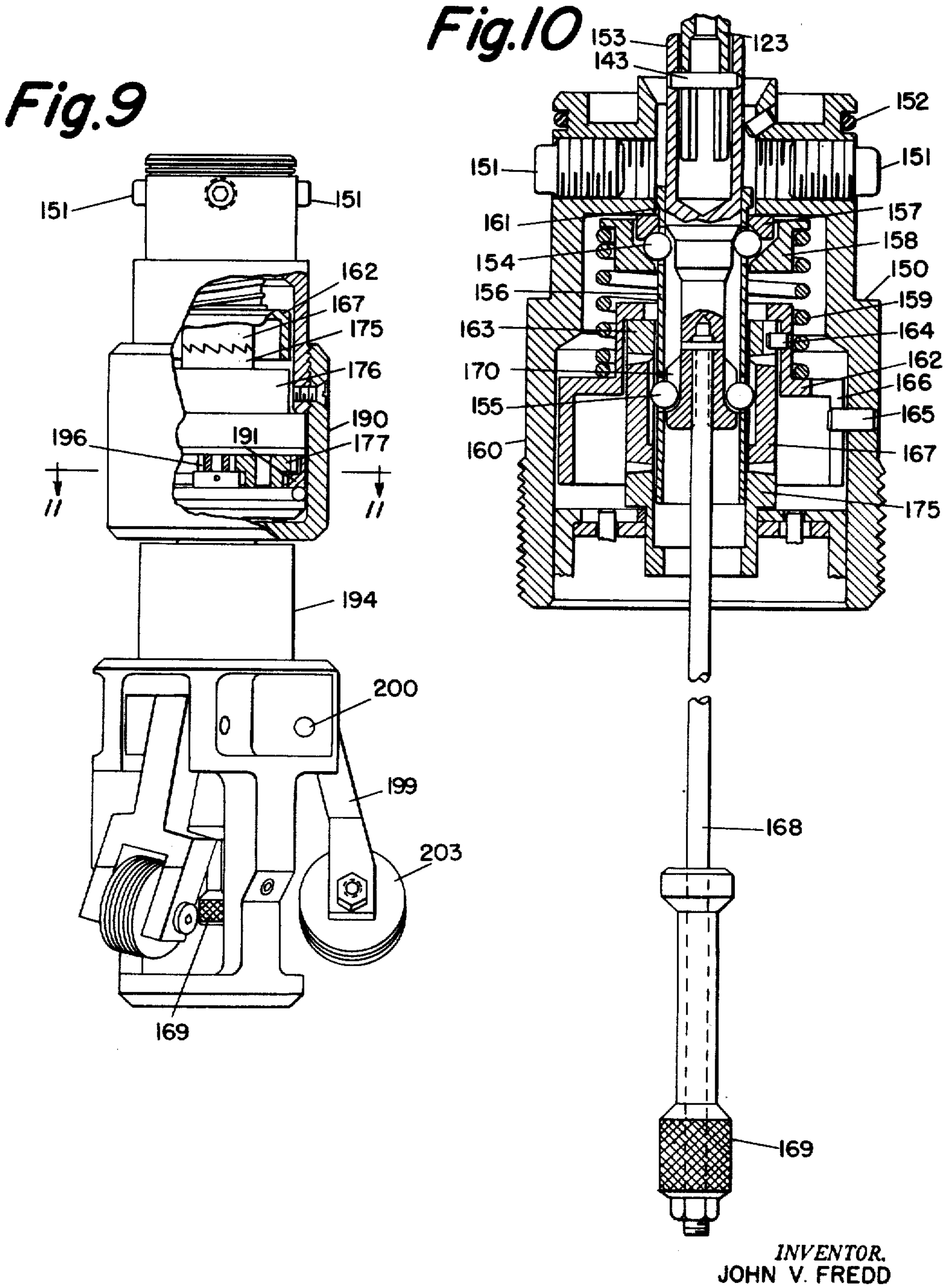
Figure 11:
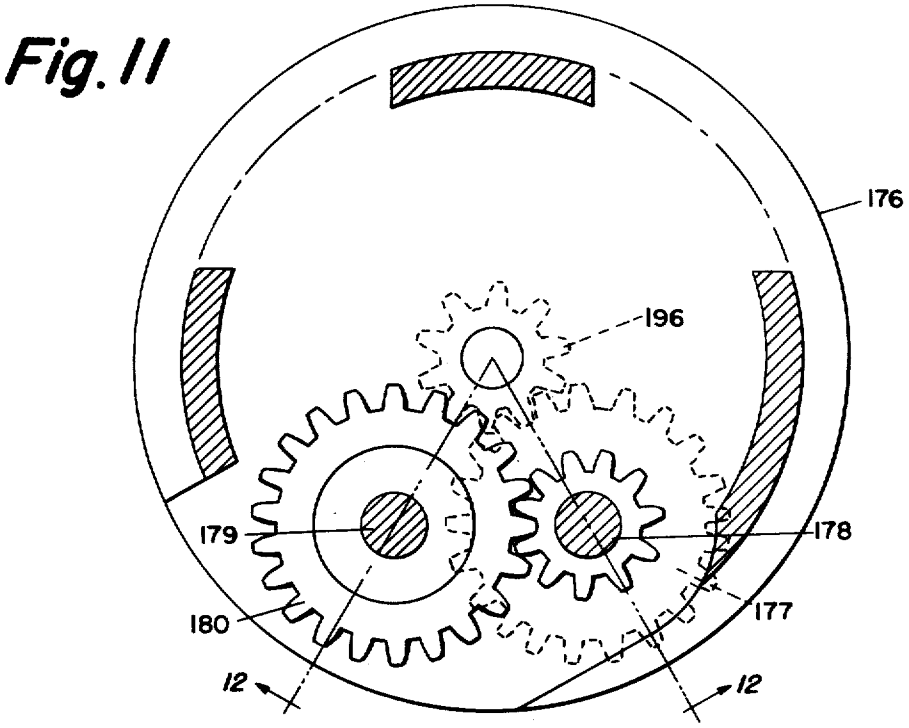
Figure 12:
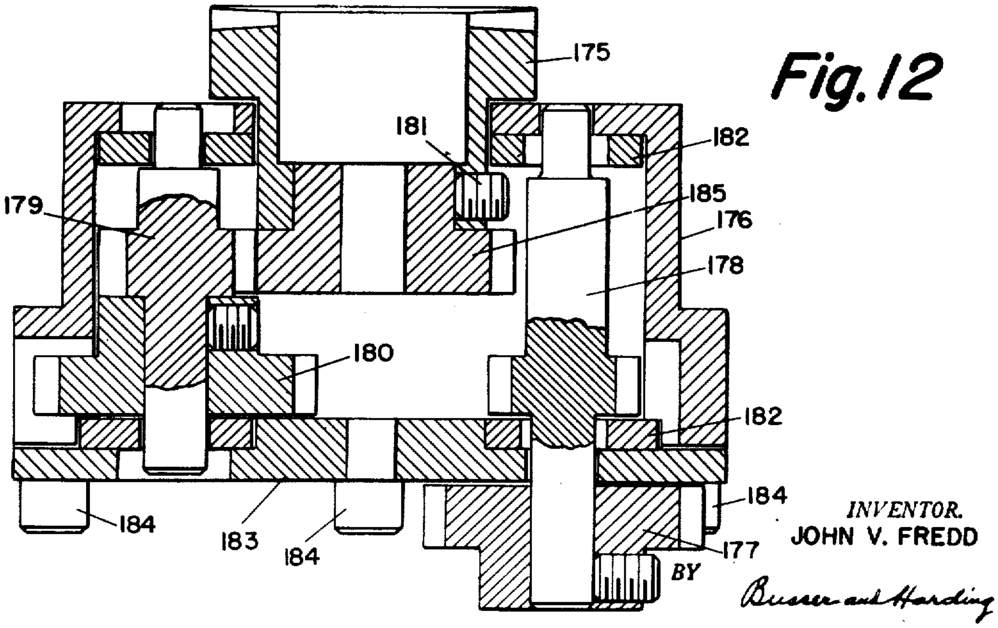
Figure 13:
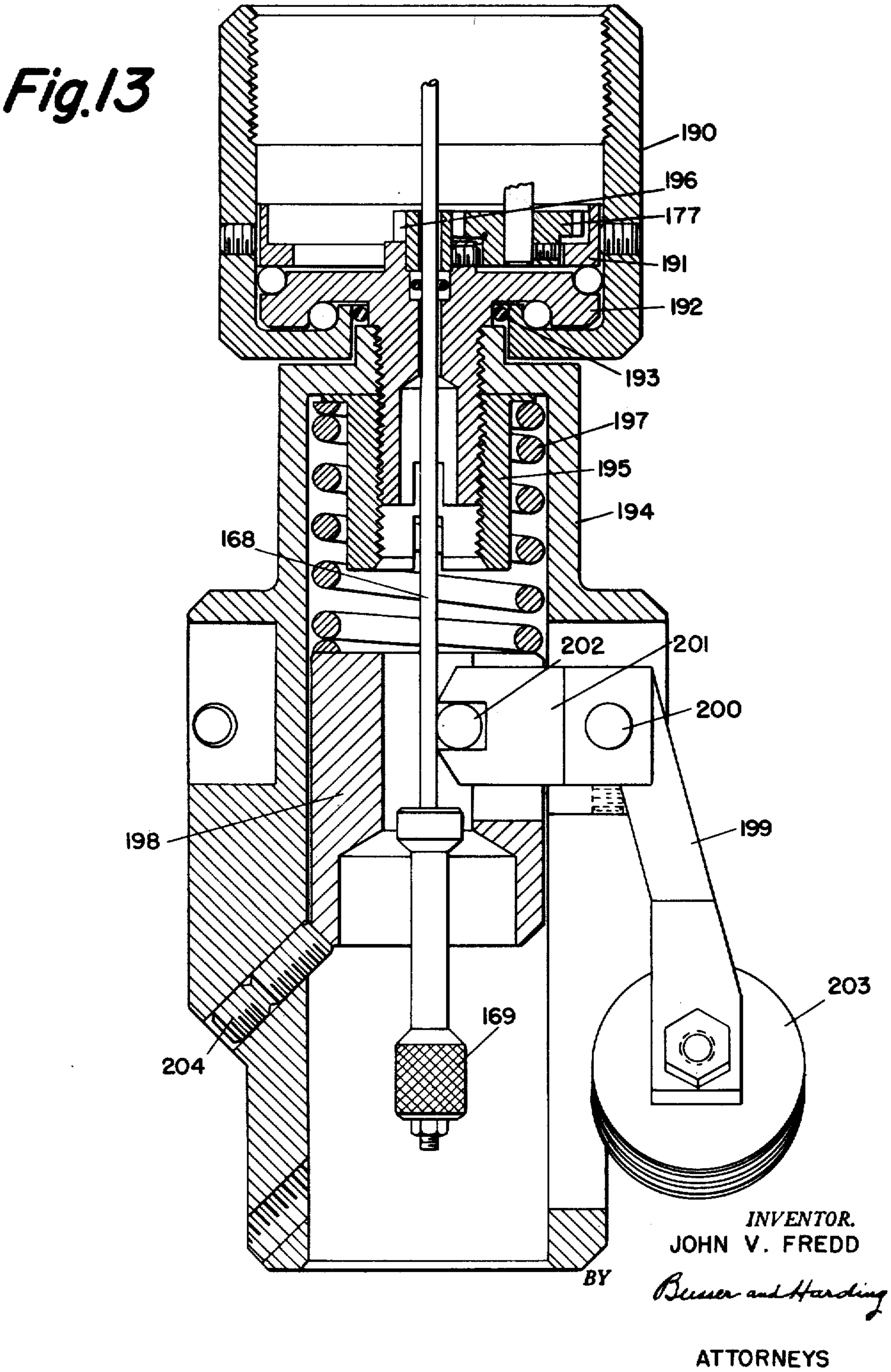

From this brief description of the principal elements of the calipering device of this invention it will be recognized that the mechanism is coordinated and arranged to mechanically produce a chart showing variations in maximum radius of the internal wall of casings of different diameters. The rotative effect of the stylus and chart with relation to each other about a non-rotating lead screw produces a record in the form of a helical line on the chart. Necessary connectors and compensators to coordinate the operations of the aforementioned principal elements will be fully described in the appended specification and illustrated in the drawings in which:

Figure 1 is an elevational view of the fully assembled calipering device,

Figure 2 is a sectional elevational view of the release, adjusting and loading wheel sub-assemblies, Figure 2*a* is a foreshortened elevational view of pull rod in Figure 2, rotated ninety degrees, Figure 3 is an elevational view of the release sub-assembly, Figure 4 is a sectional elevation view of the feeler head assembly and positioning sub-assembly, Figure 5 is a sectional elevation view of the positioning sub-assembly elements, Figure 6 is a sectional view of the stylus rod sub-assembly, Figure 7 is a sectional view showing an alternate form of stylus rod sub-assembly, Figure 8 is a sectional view of the chart chamber assembly, Figure 9 is an elevational view, partly in section, of the ratchet sub-assembly and the driving head sub-assembly with the transmission sub-assembly in partial detail, forming the drive assembly, Figure 10 is a sectional elevation view of the ratchet sub-assembly in detail, Figure 11 is a cross-sectional view of the transmission sub-assembly detail taken along line 11—11 of Figure 9, Figure 11A is a view similar to Figure 11 showing an interchangeable set of gears for the transmission assembly detail, Figure 12 is a sectional view of the transmission sub-assembly taken on line 12—12 of Figure 11, Figure 13 is a sectional elevation view of the driving head sub-assembly in detail.

*General description*

The complete calipering instrument, shown in elevation in Figure 1, is the preferred embodiment of the device as it appears ready for insertion in the tubing or casing to be surveyed. It comprises four principal assemblies, A, B, C, and D, as shown which include sub-assemblies as will be clearer after reading the accompanying description. The principal assemblies are detachable from each other for adjustment and inspection purposes, and are readily disassembled into their several sub-assemblies as well. The release head assembly A is located in the uppermost section of the caliper housing and is arranged to be connected to operating lines, rods and other tube exploring devices. Joined to the release head assembly A, the feeler head assembly B is positioned to be controlled by the release assembly and to respond to adjustments made for use of the device in different diameter casings. The chart chamber assembly C attached to the feeler head assembly B contains the chart and stylus and the necessary connectors to transmit the feeler movements to the stylus and the rotary motion to the recording elements. At the bottom of the housing the ratchet and driving head sub-assemblies and the transmission forming the drive assembly D are mounted and constitute the means by which the operating elements are actuated. In describing the details of these assemblies the instrument will be considered from the top to the bottom as here outlined, and the same numerals will be used to indicate like elements throughout the drawings.

*The release head assembly (A)*

Reference is made to Figure 2 for the details of the release head assembly A as it is combined with the adjusting sub-assembly and the loading wheels. It will be understood that the purpose of this combination of these elements in the top section of the calipering device affords better control and more efficient operation although they can be distributed in other sections of the device if desired. Attention is first directed to this figure of the drawing to show the release head assembly A as a unit including the sub-assemblies in combination. A top sub 20, machined out to receive the adjusting sub-assembly in Figure 2, is threadedly connected to the release assembly body 21 and held firmly by a set screw 35 as shown. This forms the connector element between the caliper and the suspending line and is capped with a fastening device such as a thread 22.

*The adjusting sub-assembly*

The adjusting assembly in Figure 2, shown as a sub-assembly of the release head assembly, is constructed about a centrally disposed pull rod 23 and is designed to position the loading wheels 24 and the feelers 61 when retracted. An adjusting screw 25 is centered over the pull rod 23 free of any engagement therewith, but is externally threaded to cooperate with an adjusting nut 26 for adjustment purposes. A flange 27 on the bottom of the adjusting nut 26 is engaged by the top sub 20 and held in operating position. A loading spring cap 28 is concentrically arranged about the pull rod 23 at the bottom of the adjusting screw 25 and disengaged therefrom by bearings 29 to permit free rotation while pressing against the loading spring 30. The loading spring 30 abuts the cap 28 and the loading plunger 31 the latter being positioned concentrically on the pull rod 23. A dowel pin 32 is fixed to and limits the travel of the loading plunger 31 to the extent of the slot 40 formed in the pull rod 23. In this manner the loading spring 30 is retained under compression and receives any operational shocks delivered to the dowel pin 32 by the loading wheels. The assembly on the pull rod 23 is held in place by the nut and washer arrangement as shown, also disengaged from the adjusting screw 25 by bearings 33 held in place by adjusting bearing 34. These bearings support the load incurred in positioning the feeler arms.

Referring again to the release head assembly Figure 2, the release body 21 is slotted to permit the loading wheels 24 to extend outwardly. The loading wheels 24 are carried by bell crank levers each having an actuating arm 36 extending at right angles to and inwardly from the engaging arm 37. The juncture of the two arms, or the fulcrum, is pivotally connected to the release body 21 by the pin 38 so placed as to position the engaging arm to extend through the slots in the release body 21 and to keep the bifurcated ends 39 of the actuating arms 36 in operating engagement with the dowel pin 32 in the slot 40 of the pull rod 23. The pull rod 23, as shown in Figure 2*a*, is reduced in section along a portion of its length to receive the bifurcated ends 39 of the actuating arms 36 as they engage the dowel pin 32, the latter being located in slot 40.

As the adjusting screw 25 is threadedly engaged with the fixed nut 26, rotation of the screw in one direction or the other moves the same longitudinally upwardly or downwardly in the adjusting nut 26. Downward movement of the screw 25 lowers the pull rod 23 as the lower portion of the screw bears against the spring cap 28, the latter bearing against a shoulder formed on the rod. Upward movement of the screw lifts the pull rod 23 through the bearing 34 engaging the upper portion thereof with the lock nuts mounted on the top of the same. Movement of the pull rod in either direction vertically positions the slot 40 formed therein. Pin 32 extends through the slot 40 and into fixed engagement with the spring loaded plunger 31. As the bifurcated ends of the actuating arms 36 are engaged by the pin 32, the extent of movement of the pin 32 in slot 40 limits the extent of inward and outward movement of the loading wheels. Thus, the vertical adjustment of the pull rod 23 and its slot 40 adjusts the diametrical operating position of the loading wheels. The vertical position of the pull rod 23 further adjusts the operating position of the feelers, as will be more fully described under The Feeler Head Assembly.

The assembly of the described elements enables the loading arms and their wheels to be diametrically adjusted relative to the housing by setting the adjusting screw 25 and affords a resilient shock absorber for the loading wheels through the dowel pin 32 to the spring 30. The bottom of the pull rod 23 is drilled to receive the dowel pin 41 and has a vertical slot 42 positioned transversely of the dowel pin 41 to receive and position the release sub-assembly shown in Figure 3. This forms another sub-assembly which is an opening part of the release head assembly. In Figure 2, this sub-assembly of Figure 3 is shown operably connected to the pull rod 23 by the dowel pin 41 through the transverse slot 32. The dowel pin 41 engages the uppermost hole 43 in the release link 44 as indicated in the elevation of the sub-assembly rotated 90 degrees from the view shown in Figure 2, and is shown in Figure 3.

*The release sub-assembly*

It will be recognized, by comparing Figure 3 with the assembly drawing Figure 2, that part of one of the release plates 45 has been omitted in order that a complete understanding of the linkage and its operation may be obtained. The two release plates 45—45 are held in spaced relation on each side of the release linkage by the three fasteners 46, 47 and 48. The upper two fasteners 47 and 46, act respectively as a binding post for the release spring 49 and as a pivoting stud against which the release link 44 is braced and about which the release arm 50 rotates. The release link 44 and the release arm 50 are pivotally connected together at 51 which holds the release assembly in position pending from the dowel pin 41 passed through the hole in the pull rod 23 and the remaining hole 43 in the release link 44. On the extended end of the release arm 50 opposite the juncture with the release link 44, the release dog 53 is pivoted by pin 54. The release spring 49, fastened by the stud between the pair of release plates 45—45, is also fastened to the dog 53 to hold it in operating position. Changes in the length of the dog member 53 are indicated by dotted lines showing either an extensible dog or an interchange of dogs of varying length. The spacer fastener 55 shown between the bottom extension of the release plates 45—45 on Figure 2 is the attaching means by which the release rod 80 for the feeler arms is connected to the release assembly, the adjusting mechanism and the feeler positioning means.

When the release sub-assembly is in the position shown in Figure 3, the feelers will be in their retracted position shown in Figure 4, as will be described under The Feeler Head Assembly.

*The feeler head assembly (B)*

The sectional elevation of the feeler head assembly shown in Figure 4 details the sub-assembly for positioning as a part of this view, and shows the housing connection of this section with the release assembly detailed above. The feeler head 60 can be recognized from this sectional elevation as a shaped tube longitudinally slotted and transversely grooved to hold the feeler arms 61 in position on the housing for the calipering operation. The feeler head 60 is threaded into the housing of the release head assembly section above it and is secured in place by the spaced socket set screws 62 tapped into the feeler head. The feeler head nut 63 is used to secure the feeler head sleeve 64 and to compress the feeler spring 65. A spacer ring 66, interchangeable for the size of the casing to be calipered, fits between the feeler head nut 63 and the guide ring 67 which circumferentially spaces the spring guides 68 about the periphery of the feeler head. The individually operating feeler arm springs 65 enclose each spring guide and abut the guide ring 67 and the flange 69 on the guide in constant compression which urges the feeler rod 70 against the feeler arms 61. This individual spring action extends each feeler arm independently to contact with the surface of the area to be calipered and insures independent action. It will be evident that the variations in thickness of the spacer ring 66 will add to or detract from the compression on the circumferentially spaced feeler arm actuator springs 65 and will thus load the feeler arms to suit the diameter of the casing explored. The feeler arm 61, pivotally suspended by pins 71 in circumferential abutments in the transverse slot 72 of the feeler head, are retained in operating position with the feeler rods 70 and the internal mechanism by the feeler arm collar 73.

*The positioning sub-assembly*

Within the feeler head assembly, Figure 4 shows the positioning sub-assembly of Figure 5 connected and in place between the release assembly and the feeler arms. In Figure 5 the elements comprising the positioning sub-assembly are shown in cross-section and rotated through 90 degrees from the position of Figure 4 to facilitate the understanding of the device. The release rod 80 is secured to the release assembly (Figure 3) by the screw fastened strap 81. The piston-like head of the release rod 80 is housed in a positioning retainer 82 and extends downwardly to be pin-connected as at 83 to the positioning tube 84 projecting upwardly into the positioning retainer. A swivel 85 slotted to receive the tension stylus lift spring 86 over the transversely positioned anchor pin 87 is secured against downward movement by the shoulder 88 in the positioning tube 84 and is held against the shoulder by the spring but is free to rotate if required. The lower end of the spring 86 is secured to an extension of the stylus rod cap 89 which passes upwardly through the positioning plunger 90. The positioning tube 84 and the centering plunger 90 are assembled by screw threads as shown with a ball-bearing type assembly secured by the ball retainer 91 to permit free calipering action of the stylus rod cap within the positioning plunger when operating in heavy well fluids or drilling muds. In abutment against the positioning retainer 82 and the positioning plunger 90, the positioning spring 92 is externally and concentrically positioned about the positioning tube 84 to assist in controlling the operation of the feeler arms. As mentioned under the caption of The Release Sub-assembly, the feelers 61 are locked in their retracted position as shown in Figure 4 by means of the release sub-assembly, shown in Figure 3. When the release assembly is in the position as shown in Figure 3, the release rod 80 is pulled upwardly and hence the positioning sub-assembly is raised, thus in turn raising the stylus rod cap 89 upon which the inner ends of the feeler arms 61 are positioned. By raising the stylus rod cap 89 to thus in turn raise the inner ends of the feeler arms 61, the outer tube wall contacting portions of the feeler arms are retracted.

The resistance to free movement caused by the action of the release rod 80 and the positioning plunger 90 against well fluids in the caliper housing is reduced by drilling holes through these members and thus permitting the free passage of the well fluids.

*The stylus rod sub-assembly*

Returning to Figure 4, between the stylus rod cap 89 and the stylus rod lead screw 122, shown in detail in Figure 8 in the chart chamber assembly, the stylus rod sub-assembly is shown diagrammatically. This sub-assembly is detailed in Figures 6 and 7 (an alternate form) which are here referred to for the description of the elements. The sub-assembly shown in Figure 6 is preferred particularly when wells having tubing or casing of different diameter are calipered successively with the same instrument, in that it provides more accurate transmission of movement from the feelers to the recording mechanism.

In the detailed device the ratio of a projecting feeler arm section to its inwardly extending portion is in the order of two-to-one. This is an understandable requirement for adaptability to different diameter casings. To compensate for this unequal movement of the two ends of the feeler arms, the stylus rod sub-assembly is utilized to activate the stylus a distance equal to the movement of the tubing contact end of the feeler arm. The scribed chart thus will reflect the actual depth of the tubing defect, i. e. the deepest pit or depression encountered at a calipering instant.

Considering first the preferred embodiment of the sub-assembly in question, reference is directed to Figures 4 and 6 which show the sub-assembly connected in operating position in the housing and in sectional detail. The stylus rod cap 89 is tapped to receive the stylus rod 100 which is concentrically slidable in the stylus rod guide 101. In Figure 4 it is clearly shown that the housing 102 is held in place by a set screw 103 or other fastening means in the lower part of the feeler head 60, and is also supported by the chart chamber 120. Again referring to Figure 6, a gear 104 is mounted in opposition to a roller 105 centering the stylus rod 100 in the guide 101. The gear is meshed in a stabilizing rack 106 mounted in the guide 101 and engages the lead screw rack 107 held in the rack holder 108 slidably centered in the stylus rod 100. Threaded and pin-fastened to the bottom of the rack holder 108, the rack holder plug 109 is enclosed in the sleeve 110 through which the pin 111 is passed fastening the plug 109 and the sleeve 110 together. The connector nut 112, slotted to slide downwardly in the sleeve 110 on the connecting pin 111, is pressed upwardly toward the notched bottom of the plug 109 by the spring 113. A thread 114 is tapped into the lower end of the connector nut 112 so that the threaded upper end of the stylus lead screw 122 can pass through and engage the notched end of the plug 109 in locking contact.

The alternate form of the above-described stylus rod sub-assembly is shown in Figure 7; and is designed to transmit the actual motion of the inwardly extending end of the feeler arm to the stylus without intervening correcting connection for the unequal extension of the feeler arm contact member. It comprises the housing 102, the stylus rod guide 101, a blank rack 115, and a roller 116 (a duplicate of that used to balance the gear 104 of Figure 6); and omits the lead screw rack 107. The resulting structure is a simple connection between the stylus rod cap 89 and the sleeve 110 without the proportioning feature of the gear 104 and the racks 106 and 107 of the sub-assembly shown in Figure 6. The set screws 95 lock the rack holder 108 in the stylus rod 100.

*The chart chamber assembly (C)*

Continuing the examination of the calipering device downwardly, the next section is the chart chamber assembly shown in detail in Figure 8. The external wall of the chart chamber 120 is threaded at the upper end and the locking collar 121 is positioned to lock the assembly in operating engagement at the bottom of the feeler head assembly as shown in Figure 4. Within the chart chamber, the lead screw 122 is fixed against rotation by locking firmly in place in the sleeve 110, the upper notched end of the lead screw 122 fitting in the sleeve to fasten against the lower end of the rack holder plug 109 as above described. The lower end of the lead screw has a conical point and fits freely into the square shaft 123 at the bottom of the chart chamber above the driving mechanism. Held in latched engagement with the connector nut, the lead screw is suspended directly from the stylus lift spring 86 (Figure 5) and will move longitudinally of the caliper as the stylus rod cap 89 is moved.

About the non-rotatable lead screw 122, arranged concentrically to facilitate the chart-scribing operation, a drive frame 124 and the chart tube 125 are arranged to rotate. A travelling nut 126 mounted on the lead screw secures the stylus holder 127 and the stylus point 128 in engagement with drive frame 124. The stylus point is urged outwardly to contact the chart by a spring 129. Free to rotate about the drive frame, yet in position to be contacted by the stylus point 128, the chart 130 is supported in place by the chart tube 125 and the chart retainer 131. A ball bearing 132 positions the chart tube 125 within the chart chamber and permits free, balanced rotation.

The lower end of the chart 130 and chart tube 125 are mounted on the bevel gear housing 133 which holds them firmly in place. Transverse of the bevel gear housing 133, a shaft 134 is held in position by rack screws 135—135. A pair of bevel gears 136—136 are mounted to rotate on the shaft 134. The shaft 134 is machined with a square hole at 137 to fit over the square shaft 123 and thus to be revolved as the square shaft is rotated. The lower gear 138 is fixed to the stationary shaft 139 by the set screw 140. As the upper gear 141 is fixed to the drive frame 124 the rotation of the square shaft 123 results in the stylus and chart tube being rotated in the same direction at predetermined speeds relative to each other. The ball bearing 142 encloses the stationary shaft 139 and maintains the chart tube and chart in alignment with the gear mechanism during the operation.

*The drive assembly (D)*

Arranged to be attached to the lower end of the chart chamber housing below the square and stationary shafts described, the drive assembly is shown in Figure 9 in general outline. The details of this figure show the elements in meshing engagement for the sub-assemblies. Each of these sub-assemblies is described in detail here below. Figures 10 to 13 inclusive are detailed views of the ratchet or clutch, transmission, and driving head sub-assemblies.

*The ratchet clutch sub-assembly*

In Figure 10 the shoulder off-set 150, the circumferentially spaced chamber screws 151 and the inset O ring 152, form the connecting means between the ratchet sub-assembly and the chart chamber section (Figure 8) immediately above it. The ratchet shaft 153 projects upwardly to mesh with the bifurcated end of the square shaft 123 and the pin 143 transverse the ratchet shaft to make driving engagement therewith. Below the transverse pin connection, the ratchet shaft 153 is machined to position two sets of bearing balls 154 and 155 in circumferentially spaced holes in the ratchet tube 156. The two sets of bearing balls 154 and 155, at separate elevations within the ratchet tube 156, serve two different purposes. The upper set 154, immediately adjacent the connection of the ratchet shaft 153 with the square shaft 123 of the chart chamber assembly shown in Figure 8, forms a locking device or detent. The bearings 154 cooperate with the detent bushing 157, detent plate 158, ratchet spring 159 and the machined surface of the ratchet shaft 153. The ratchet tube 156, slidably concentric of the drive body 160, is flanged at 161 to engage the bushing 157.

The ratchet spring 159 is positioned between the spring engaging flange of the detent plate 158 and the ratchet guide 162. Within the ratchet guide 162 a fixed ratchet 163 is keyed as by the dowel 164 and is thus restrained from rotation. A dowel pin 165 is set into the drive body 160 to engage the slot 166 in the ratchet guide 162. Centered about the ratchet tube 156 below the fixed ratchet 163, and at the elevation of the lower set of bearing balls 155, the intermediate ratchet 167 is positioned. This interminate ratchet 167, as its name implies, operates between the fixed ratchet and the driving ratchet 175 of the transmission (Figure 12) which connects the drive assembly (Figure 13) and the ratchet assembly (Figure 10) as shown in the assembly (Figure 9) in proper geared ratio. Within the intermediate ratchet 167, a disengaging mechanism, involving slots or keyways in the inner face of ratchet 167, the slotted or fluted portion 170 of the ratchet shaft 153 and the ratchet tube 156, is shown in normal position engaged for operation by the lower set of bearing balls 155.

As will be fully understood, after reading a description of the preparation of the device for the calipering operation, the ratchet rod 168 and the knob 169 on the end of the rod form an important part of the ratchet assembly. This rod and knob are a permanent part of the assembly and project downwardly through the transmission and drive assemblies of the assembled instrument as in Figure 9.

*The transmission sub-assembly*

The transmission sub-assembly is shown in detail in Figures 11 and 12, and the operating position in Figure 9. The driving ratchet 175 is adapted to fit into the ratchet assembly in Figure 10. The purpose of this transmission sub-assembly is to connect the driving head sub-assembly of Figure 13 to the ratchet sub-assembly of Figure 10 and to support a gear train with interchangeable principal actuating gears; resulting in flexibility of the device affording the pre-selection of chart-scribing ratio to the length of tubing calipered.

Referring specifically to Figures 11 and 12, and generally to Figures 10 and 13 for the connections as to the transmission, it will be noted that the gear train assembly is enclosed in a transmission case 176. The general detail assembly of this lower section of the instrument in Figure 9 shows the position of the transmission assembly in the case 176 as it fits into the bearing cap 190 and is held in position therein between the ratchet assembly (Figure 10) and the bearing ring 191. The screws 184 project from the bottom of the transmission assembly and fit into notches in the secured bearing ring 191 which prevents the transmission from turning in the bearing cap 190 when the drive assembly rotates.

An examination of Figures 11 and 12, concerned solely with the details of the transmission assembly, shows a gear 177 of selected number of teeth, adapted to engage the gear 196 of the drive head sub-assembly (omitted for clarity from Figure 12) proportioned in the number of teeth to relate these two sub-assemblies in proper rotation. The gear 177 is set tightly on the change pinion 178 which together with the pinion 179 and the change gear 180 is interchangeable with similar gears and pinions (as shown illustratively in Figure 11A at **178*a* and 180*a*) to secure pre-selected ratios between calipering distances in the casing and chart recording. The change pinion 178 and the change gear 180 mesh together for transmission of the rotary motion of the driving ratchet 175 through the gear 185 to which it is fastened by the set screw 181. The interchangeability of the change pinion and/or the change gear is facilitated by mounting these gears and pinions between adjustable plates 182, in turn secured by the cover plate 183**.

*The driving head sub-assembly*

As is evident by consulting Figures 9 and 13 the connection between the above-described transmission sub-assembly and the rotatable driving head sub-assembly is accomplished in the bearing cap 190. The bearing ring 191, held by set screws, described as being a means to prevent the rotation of the transmission also secures the main bearing 192 of the drive assembly within the bearing cap 190. An O ring 193 seals the top of the drive body 194 where it engages the main bearing 192 and passes through the bottom of the bearing cap. On the threaded portion of the main bearing 192 below the connection with drive body 194, a lock nut 195 is turned to engage and retain the drive body in position. The main bearing and the lock nut are notched and machined to receive tools for ease in assembly and disassembly.

Within the drive body 194, and enclosing the lock nut 195, a loading spring 197 is mounted to operate against the drive arm plunger 198. The drive body 194 is slotted to receive a desired number of circumferentially spaced drive arms 199 which are bell crank in shape and are pivotally mounted on the drive body as by pivot pins 200. The inwardly extending arm 201 of the bell crank shaped drive is bifurcated to engage dowel pins 202 in the drive arm plunger 198. Drive wheels 203 are angularly mounted in the contact extension of the drive arms to frictionally engage the inner wall of the tubing or casing being calipered and thus rotate the drive assembly therein. To retain the drive arm plunger 198 in the limits of proper operation depending on the length of the drive arm used and the extent of its movement, a series of stops, such as set screws 204, are placed in the side wall of the drive body.

*Operation in general*

It is believed the detailed description above will be sufficiently understandable to those versed in the art to visualize the operation of the device. However, as the elements are combined to operate under a wide range of dimensional variations, the one device adaptable to caliper casings within the selected range with a high degree of accuracy and exceptional performance characteristics, the related movement of these elements in a typical calipering operation will be traced. This instrument is designed to operate in casings of a selected range of diameters under high pressures and in the presence of fluids and gases including salt water and drilling muds. Although the preferred embodiment indicates several elements as interchangeable with like elements of different dimensions, the number of such substitutions are limited, and can, if desired, be replaced with extensible elements. The assemblies and sub-assemblies of the caliper, as described, are retained and operate within the range of dimensions specified. As an example, the caliper having a casing dimension range from 5½ inches to 8⅝ inches outside diameter, has been selected for operational description. The features of this device are applicable to other dimensional brackets or to extension over a wider range of sizes.

The caliper of our example is designed for separation into two convenient sections for shipping, packing and storage. One section includes the release head with the release, adjusting and loading arm sub-assemblies together with the feeler head, positioning and stylus rod sub-assemblies. The remainder of the device consisting of the chart chamber assembly, ratchet, transmission and drive head sub-assemblies, forms the second section. In addition to facilitating the handling of the caliper, this division is made at a section where it is mechanically practical. When placed in the shipping case the feeler arms are partially retracted, and are thus protected from damage.

*Preparation for calipering*

To survey a string of casing in order to determine any of the many possible conditions revealed by calipering, the instrument received in the two mentioned sections is prepared for operation by first removing the chart chamber 120 from the lower section and fastening it to the upper section. The top sub 20 is then removed from the top section and the stop position of the feeler arms is adjusted to the specified diameter slightly under the outside diameter of the casing to be calipered. This adjustment of the feeler arms 61 is made with the aid of the adjusting assembly and by the relative positions of the chart chamber 120 and the stylus rod assembly shown in Figures 6 or 7. By means of the adjusting assembly which vertically positions the pull rod, the diametrical operating positions of the loading wheels and the feelers are simultaneously effected. Once the proper adjustment has been made for a given diameter of tubing to be calipered, the release assembly is placed in operating position, thus retracting the feelers to their inoperative position.

Having adjusted the feeler arms to the selected outside diameter or stop measurements, the chart chamber 120 is secured firmly against the stylus rod assembly (Figure 4) to furnish a support and positioning bracket for the feeler arms. The release dog 53 is adjusted to suit the diameter of the casing to be calipered, either by regulating an extensible member, or placing a separate rigid member of selected length in the release assembly.

By the "stop" and "adjusting" operations described, the elements in the upper section are made ready for calipering. Both the loading arms and the feeler arms are controlled at the same time and by a common adjustable element. Consequently, the calipering operation begins as soon as the operator intends and there is no lost space on the chart due to further adjustment or protracted movements of the elements into contact with the casing surface as the caliper begins the run.

After the adjusting assembly is set to the required dimension, the top sub 20 is replaced on the upper section. The chart is then inserted into the chart tube 125 and the chart retainer 131, with the bearing race 132 attached, is pressed into the end of the chart tube. The chart may be of any preferred material but is usually made of sheet steel shim stock properly treated on the tracing face so as to be readily marked by the stylus point 128. The travelling nut 126 and stylus holder 127 with the stylus point 128 are moved to the upper end of the lead screw to engage the top of the chart at the beginning of the calipering operation, to be moved downwardly as the calipering continues. The lead screw 122 is threadedly engaged by a tapped tool inserted through the square shaft 123 for control in attaching it to the stylus rod sub-assembly. Preliminary to the linking of the lead screw and the stylus rod sub-assembly, the bevel gear housing 133 and related parts are inserted into the chart tube 125 and the entire chart tube assembly is inserted into the chart chamber 120. The lead screw 122 is then guided into attachment with the stylus rod assembly by manipulation of the tool mentioned above and after connection is made, the tool is removed. This completes the assembly of the top section of the caliper in preparation for a casing survey.

Turning now to the lower section, the arrangement and adjustment of the elements and sub-assemblies therein is next in order. The drive arms 199, which will operate properly at the required diameter are adjusted if extensile, or the proper interchangeable pieces installed. The automatic disengaging device described as part of the ratchet assembly is checked by means of the ratchet rod 168 and ratchet knob 169 by testing the force required to disengage the lead screw drive. This is a critical adjustment since the lead screw is used to longitudinally move the ratchet shaft 153 to disengage the operation of the intermediate ratchet 167 and would be damaged or bent if the force required was excessive. Also, by rotating the drive head sub-assembly it is possible to check the operation of the transmission and ratchet sub-assemblies by observing the direction of rotation of the ratchet knob.

The two sections of the caliper are now ready to be assembled for introduction into the casing and the calipering operation. The assembly step is accomplished by inverting the top section and filling the chart chamber with lubricating oil. The lower section is then coupled to the inverted upper section and the instrument is ready. The top sub is connected to the lowering line, the disengagement mechanism is checked by noting the position of the ratchet knob 169 and the ratchet and drive head sub-assemblies checked, finally, by again rotating the drive and observing the rotation of the ratchet knob. Additional lubricating oil is added to the device through the hole for the set screw in the feeler head to completely fill the stylus rod assembly.

As the full pressures within the casing are admitted to all parts of the caliper mechanism, including the recording stylus and chart chamber assemblies, and equalized throughout by means of the lubricant filling these spaces, packing glands and gaskets with their inherent frictional drag are eliminated. The result of the equalization and balancing of the well pressures is that the stylus follows a slight variation of the feeler arm which moves the greatest distance as the feeler arms explore the inner wall of the tubing string. The O rings in the ratchet and drive assemblies are positioned to prevent leakage of the lube oil and preserve the hydraulic distribution of pressure equally throughout the instrument.

*The calipering operation*

The caliper, with the feeler arms and the loading wheels positioned by the adjusting assembly as outlined above, is inserted in the casing and lowered to the desired depth selected for the beginning of the calipering survey. During the lowering of the caliper, the feelers remain in the retracted position and the dog 53 is in light engagement with the casing wall having sufficient movement to pass freely downward past the casing joints without disturbing the release mechanism, yet held in proper position by the release spring 49. The frictionally engaged drive wheels 203 in the rotatable drive head sub-assembly at the bottom of the calipering device are in contact with the inner wall of the casing describing a helical path in a direction opposite to that in which they will rotate during the calipering run when the instrument is moved in the upward direction. The angle at which these drive wheels engage the tubing wall and the direction of movement of the caliper determine the direction of rotation of the drive assembly. This has been considered in the selection and positioning of the clutch used in transferring the movement of the drive head sub-assembly to the scribing mechanism and will be considered fully, later in the disclosure. The loading wheels 24, which are in vertical alignment with the housing, engage the inner surface of the casing wall to maintain the caliper in alignment and prevent the entire device from rotating in response to the rotary movement of the drive head. The wheels are located at the top of the device and are connected through the adjusting sub-assembly for operation in varied diameter tubings and casings.

On reaching the desired depth in the casing of our example, upward movement of the instrument engages the dog 53 in the first casing joint above the stopping point and causes the release sub-assembly to function. The dog 53 in Figure 3, is forced downwardly as it is caught in the casing joint and the caliper continues the upward movement, causing the release arm 50 to pivot about the fastener 46 between the release plates 45. This circular movement of the release arm 50 in a clockwise direction drops the engaged dog 53 downwardly and out of contact with the casing joint and at the same time drops the whole release sub-assembly with reference to release link 44.

The downward movement of the release sub-assembly permits the positioning sub-assembly of the feeler head assembly to move downwardly. As the feeler arms 61 were preliminarily adjusted to extend to a measurement equal to the outside diameter of the casing to be calipered in order to penetrate the deepest pits or fractures, prior to being retracted to the control of the release and adjusting assemblies, they are now released automatically, free to move to that pre-set dimension. This permits the feeler arms to spring outwardly into contact with the tubing walls under the urging of the independent feeler rods 70 and the individual springs 65. This movement to contact with the casing wall begins the calipering operation.

*Operation of the positioning sub-assembly*

Before detailing the operation of the elements in the act of calipering as the device is pulled upwardly through the casing, it is of importance to understand the function of the positioning sub-assembly detailed in Figures 4 and 5. This sub-element of the device is a general improvement in caliper construction, and is of particular application in instruments adapted to operate in casings of different diameters. It is externally attached to the release body 21 by the positioning retainer 82 and internally attached to the release sub-assembly between the release plates 45 by fastening the release rod 80 to the stud or pin 48 at the bottom of the release assembly.

As the linkage of the release assembly extends by the described movement through activation of the dog 53, the release rod 80 moves downwardly permitting the positioning tube 84 and the positioning plunger 90 to also assume the new position. The movement of the plunger 90 is assisted by the positioning spring 92 thus exerting an equal force on all the feeler arms in their movement to contact with the casing inner wall. This action of the positioning spring is constantly in effect and keeps the caliper in alignment with the center line of the casing. It will be recognized that this is a requirement which must be met in instruments of this type particularly those adapted for use in different diameter casings. The equal pressure on all the feeler fingers, under normal conditions and on the greater number where pits are encountered, centers the caliper within the casing string and minimizes errors on the charted record which could otherwise arise.

This connection of the positioning plunger 90 to the adjusting and release sub-assemblies through the positioning tube 84 and the release rod 80 is advantageous in that the positioning spring 92 completes the action of the release sub-assembly and prevents possible interference with the stylus rod by the positioning plunger. Once the release sub-assembly is tripped, it is urged in its travel by the action of the feeler springs until the feeler arms touch the casing and then continues by the action of the positioning spring until it completes its travel when the positioning plunger comes to rest on the feeler arms. Action of the positioning plunger is not impeded by the release assembly in the released, or calipering position.

Internally, the positioning assembly is connected directly to the release assembly as indicated, and the downward movement of the positioning tube 84 frees the stylus rod cap 89 for movement in response to individual feeler arm action. In addition to the stylus rod cap being a connector to which the stylus rod assembly is fastened, it is flanged to cooperate with the underside of the feeler arms' inward extension and is a supporting member. The tension type stylus lift spring 86, by means of the connection with the stylus rod assembly and the lead screw 122, affords advantages in structure and operation over previously known calipers. By placing the spring above the stylus rod, it is possible to use a large diameter (flat rate) spring without affecting adversely the design of the stylus rod or ratchet assemblies. This permits increased sensitivity, lower feeler arm loading, and because the spring is attached to the positioning plunger, it is not affected by the adjustments made for various casing sizes. By suspending the stylus rod 122 from the stylus lift spring 86, frictional drag resulting from supporting bearings is reduced to a minimum. The use of a tension spring eliminates side loads normally introduced by a compression spring. The lead screw 122 suspended in this manner is subjected to no other loads than the rotation of the travelling nut 126 and the stylus point 128 in recording.

In addition to the uniform spring pressure of the positioning plunger on the feeler arms, each arm is separately actuated outwardly by the feeler rods 70 which transmit the pressure of the spring guides 68 to each of the arms separately. As set by the adjusting assembly for each separate calipering operation, the outward movement of each individual feeler arm is limited only by the casing wall. The caliper is adjusted for each condition so the extreme diameter reached by the arms is the same as the outside diameter of the casing, thus accurately responding to couplings or collars or to extreme pitted conditions. This setting is, therefore, large enough to indicate complete penetration of the casing by corrosion and serves as a reference in making an accurate interpretation of the depth of the corroded area in the casing. Also, this setting is small enough to permit easy entry of the caliper into the surface connections of the well and to travel downward through the casing couplings if the feeler arms are not in the retracted position, as required in repeating surveys over limited casing length. The ideal feeler arm loading is the minimum loading attainable which will minimize the wear on the feeler arm contact surface and possible damage, and yet produce an accurate chart if only one feeler arm moves out to its maximum limit of travel. An individual feeler operating spring 65 should be strong enough to move its feeler arm firmly out to the limit of travel and at the same time depress the stylus rod cap 89 against the tension of the stylus lift spring 86. In turn, the stylus lift spring must be of sufficient strength to support the stylus rod cap 89, stylus rod assembly, lead screw 122 and the attached stylus elements. In addition, the lift spring must be of sufficient strength and resilience to keep the supported elements in continuous contact with the feeler arm extension when the feelers are moving into and out of corrosion pits and casing collars at fast calipering speeds.

*The driving mechanism*

During the downward movement of the caliper in the casing the loading wheels 24 are pressing against the inside casing wall, and the drive head friction wheels 203 are engaging the casing wall also. The drive head sub-assembly shown in detail in Figure 13 is rotating at a speed commensurate with the rate of the downward movement of the caliper in the casing. The angle of the drive wheels 204, which engage the inner tubing wall in a helical trace as the calipering instrument moves up or down, is such as to rotate the driving head counter-clockwise, locking down into the casing, as the caliper descends, and to rotate it clockwise on the ascent. Therefore, as the calipering device descends in the tubing, the drive head is rotating counter-clockwise (viewed from the top) and transfers this direction of rotation to the transmission shown in Figures 11 and 12. Tracing the initial counter-clockwise movement of the drive head through the transmission shows the driving ratchet 175 (Figures 9 and 10) arranged to slip on the intermediate ratchet 167 in this direction of rotation. The intermediate ratchet is held also against the direction of rotation by the fixed ratchet 163 with which it is engaged. Consequently, there is no transmission of motion to the square shaft 123 necessary to actuate the gear train in the chart chamber as shown in Figure 8 and no helical trace on the chart is made.

As the caliper is moved upwardly and the release assembly operates to place the feeler arms in calipering position, the rotary motion of the drive head is reversed and thus reverses the direction of drive of all the members concerned. The ratchet actions are reversed in direction of the drive and intermediate ratchets engage while the fixed ratchet no longer controls the intermediate member. A rotary motion is imparted to the intermediate ratchet 167 and is transmitted to the square shaft through the lower bearing balls caught in the slots of the clutch and shaft. The square shaft is supported by the detent plate 158, upper bearing balls, and the ratchet spring 159 which places it in driving relation with the gear train at the bottom of the chart chamber shown in detail in Figure 8.

*The recording mechanism*

The rotary motion transmitted through the ratchet assembly, now in a clockwise direction relative to our point of observation, is conveyed to the chart chamber by the union of the ratchet shaft 153 with the bifurcated end of the square shaft 123. The fixed or stationary shaft 139 encloses the square shaft, maintains the chart tube 125 in rotating position relative to the chart chamber 120, and supports the lower fixed bevel gear 138. A bevel gear shaft 134, slotted with a square opening to receive the square shaft 123, supports bevel gears 136—136 which mesh with the fixed gear 138 and because of the rotation of the square shaft, rotate the drive frame 124 by means of gear 141. To rotate the chart 130 through rotation of the chart tube 125, the bevel gear shaft 134 is secured by rack screws 135 to the bevel gear housing 133, forming the bottom support of the chart tube. By this gear arrangement the stylus holder 127 is rotated twice around the lead screw 122 while the chart tube 125 makes one complete revolution. It is therefore, possible to use a lighter weight lead screw and stylus assembly with closer threads and still obtain a legible, correct chart by the combined rotation of the stylus and chart in the same direction.

A requisite of primary importance in mechanically scribed charts is that the record be clear and distinct. The helix scribed by the stylus point 128 on the chart 130 has a pitch which is two times that of the lead screw under the described operating conditions. This enables a lead screw to be used which is comparatively small and light in weight. It is possible, therefore, to construct the entire mechanism with lighter and smaller operating elements. The relative rotation of the stylus holder on the lead screw and the chart tube scribes, as a helix, parallel lines equally spaced apart on the chart.

As has been indicated above, the elements of the disclosed device are directed to producing a clear and accurate chart record. The original adjustment of the feeler arms and loading wheels places the stylus at the top of the chart ready for the calipering operation without loss of the chart space. By using the combined motion of the chart and stylus, lighter and consequently more sensitive members may be used. Further clarity of record dependent upon the casing size and calipering results desired, is possible by using the most advantageous gear relation in the transmission. The chart can thus be made to reflect the casing distance calipered in different chart scales to properly show the record of the internal irregularities by adjustments in the driving mechanism transmission.

*The stylus rod sub-assembly*

The above description of preparing the device for operation, the lowering into starting position, and the beginning of the calipering, has emphasized the structural and operating advantages of the detailed elements. The resulting compact helical movement of the stylus on the chart by the mechanism in the lower section of the caliper is interrupted by the action of the released feeler arms which are exploring the inner wall of the casing, as the instrument moves upwardly, for pits and joints. A pit in the casing permits one or more of the feeler arms to move outward, and, at the same time, to press downwardly on the stylus rod cap 89. It will be noted that should two or more feeler arms move outwardly at the same time, the effect of that which moves out the greatest distance is alone transmitted to the stylus rod. This reveals the locus and measurement of the greatest defect and is therefore, a measure of the true damaged condition. The sum of the depths of the pits, depressions and joints, is never measured by this device.

The preferred embodiment of the caliper disclosed, illustrates the selection of the feeler arms designed so the ball type feeler points are exactly twice the distance from the fulcrum as the center of the radii which act upon the stylus rod cap. The feeler points are also exactly 90 degrees from the centers of the radii. This arrangement, by bell crank action, causes the stylus rod cap to move axially exactly one-half of the distance the feeler point moves radially. The two-to-one leverage of the feeler arms is used because (*a*) it permits a wide range of casing sizes to be explored with one caliper instrument; (*b*) wear on the feeler points is reduced; and (*c*) sensitivity is increased by the stylus rod 100 travelling at one-half of the speed of the feeler points. The last advantage will be further emphasized when it is understood that the stylus rod has the greatest mass in the recording system. It appears evident, however, that the ratio of the lengths of the respective sections of the feeler arms may be changed to suit the designed or special conditions, being merely a matter of relationship without affecting the invention as herein disclosed.

In moving the stylus rod cap 89 downwardly, placing the stylus lift spring 86 under greater tension in an attempt to return to the neutral position, the stylus rod assembly and the lead screw 122 with the stylus assembly, are moved also. The amount of movement transmitted through the stylus rod assembly to the stylus point 128 depends upon the use of the assembly as shown in Figure 6 or that shown in Figure 7.

The form of stylus rod assembly shown in Figure 6, referred to here as a "multiplier" mechanism, is designed to compensate for the ratio of the contact member of the feeler arm to the inwardly extending member. In the preferred embodiment described, that ratio is in the order of two-to-one although other proportions are acceptable, and the assembly shown here is used to bring the stylus point movement back to a one-to-one ratio with feeler point movement and produce a standard scale chart. It is this subassembly of the device used in combination with the described elements which makes practical the feeler arms of unequal members for use in casings of varied diameters.

As the stylus rod cap 89 is moved downwardly by the feeler arm action, the stylus rod 100 with the gear 104 and roller 105 mounted as shown moves downwardly an equal distance. The roller 105 is arranged to center the device and support the lead screw rack 107 which is meshed with the gear 104. A stationary rack 106 is fixed in the stylus rod guide 101 in position to receive the teeth of the gear 104 which moves the lead screw rack 107 and the attached stylus rod a distance twice as far as the stylus rod 100 is moved by the feeler arms. Thus, a one-to-one ratio is produced on the chart by the combined arrangement of the unequally membered feeler arms and this "multiplier" mechanism.

By providing the alternate stylus rod assembly, direct connection between the stylus rod 100 and the lead screw is possible. Such a connection eliminates the "multiplier" mechanism and is used to produce a record on the chart which is in proportion to the movement of the operating members of the feeler arms. This device is of particular advantage where there are variations in the casing diameter so as to make a standard chart difficult to read because of overlapping lines. Again, it is possible by this linkage to produce a chart in which the vertical record is one-half scale, and by halving the horizontal movement thus doubling the total footage obtainable in the calipering operation. Other combinations of vertical to horizontal scales are readily obtainable. It will be recognized that the "multiplier" mechanism may either extend or contract the feeler movement in transmitting it to the recording mechanism.

*The chart record*

The movement of the stylus may now be summarized having completed the description of the feeler arm action and the rotation of the elements by the drive and connecting assemblies. The downward, longitudinal movement of the lead screw interrupts the helix which the rotating stylus is scribing on the chart also rotating but at a slower rate of speed than the stylus. The resulting log, when the chart is removed from the caliper and spread out flat, is a series of parallel lines which show at predetermined scale every significant action of the feeler arms. The spacing of the lines, determined by the pitch of the lead screw and the relative rotation of the stylus holder and chart tube, permits visual examination of the survey and exact measurement of the corrosion pits. Casing joints show clearly as a series of practically regular interruptions for standard length casing, and are readily identified for any length casing. The chart lines will vary from almost straight to very jagged, depending upon the severity of the corrosion. As indicated above, the flexibility of the instrument described is such as to permit various charts to be scribed as required by the specific situation.

*Re-calipering*

A particular advantage of the disclosed device resides in the ability to re-caliper a specific length of tubing without removing the device from the casing string for resetting the chart mechanism and stylus. Within the limits of the chart space, readings may be repeated on a particular section of casing as desired. It has been shown above that the calipering operation is performed only as the instrument moves upwardly in the casing and that when moving downwardly the clutch arrangement is designed to prevent rotation of the stylus holder and chart tube. Consequently, a length of casing may be surveyed by the upward movement of the caliper and resurveyed until the chart surface is exhausted and the stylus is moved to the bottom of the chart chamber by repeatedly dropping the instrument down to the point of beginning and again surveying on the upward movement. The release mechanism, having once been unlatched, is not set again, but presents no difficulty as the dog is dropped downwardly in the release linkage and into the body of the caliper well removed from the casing wall. The bevelled surfaces of the feeler arms are formed at an angle to afford easy passage downwardly in the casing without damage.

*The disengaging device*

Should the instrument be operated beyond the chart limits, however, the record already obtained is preserved unmarred by the operation of the disengaging device which forms a part of the ratchet assembly as shown in Figure 10. All recording action on the chart requires that the stylus rotate and move downwardly on the lead screw even though the chart tube is rotating relative to the driven stylus holder in order to maintain a legible pitch of the scribed helix on the chart. This direction and rate of travel are required, notwithstanding the axial movement of the lead screw in response to the feeler arm action as described. Consequently, the survey will ultimately move the stylus holder to the bottom of the chart regardless of whether the run is continuous or repetitious, as the clutch arrangement prevents the upward movement of the stylus on the lead screw even though the driving mechanism is rotatably responsive to both upward and downward movement. Figure 10 shows the lower ball bearings resting in flutes or slots 170 in the ratchet shaft 153 and engaging the intermediate ratchet 167 through apertures in the ratchet tube 156. Downward pressure of the stylus holder 127 on the upward projection of the square shaft 123 embracing the lead screw as shown in Figure 8 moves this shaft downwardly, in turn depressing the ratchet shaft 153. When that downward movement is sufficient, the balls in the lower position are released from the slots 170 in the ratchet shaft now being above the slot locus and the intermediate ratchet 167 is free to rotate without affecting the ratchet shaft 153 which now stands still. All motive power is removed from the square shaft and the chart mechanism is no longer operative. Thus, the bearing balls which form a detent device in keeping the ratchet shaft engaged also keep it disengaged. The reduced diameter of the ratchet shaft which accepts the balls in the disengaged position minimizes any tendency of the shaft to rotate due to friction only.

*Completion of the operation*

The surface operating crew keeps a running tally of the number of feet of casing through which the survey is made by upward movement of the caliper. The fixed measurements of the chart length and lead screw pitch being known, together with the interchangeability of the multiplier mechanism of the stylus rod assembly which is mathematically exact for the selected arrangement and the selected gears of the transmission assembly, the number of feet of tubing possible to caliper on one chart is readily determined. The survey having been made, the caliper is withdrawn from the casing string in reverse operation to that described for starting the operation. The caliper is inverted and the ratchet and drive assembly lifted from the remainder of the mechanism. The special tool for engaging the lead screw is now used to disengage that element and the chart tube assembly is lifted from the chart chamber. The chart is withdrawn from the chart tube and spread for study. Photostats are readily made from the chart and enlarged, if desired, for extensive interpretation and inclusion in survey reports.

The example selected for disclosing the operation of the caliper considers a well under pressure in which the casing was the object of the survey. This is not the limit of the operational possibilities of this device and is not so intended. The calipering instrument, as here disclosed, is flexible in application and may readily be used to survey casings and tubings of different diameters within a wide range, in any position and under conditions ranging from atmospheric to very high pressures.

Although the principal purpose intended for the device is, as stated, to disclose a caliper capable of operating in a plurality of varied diameter tubes and casings, the combination of elements illustrated may advantageously be used either separately or together to facilitate the operation of calipers generally. The selection and arrangement of the elements and sub-combinations of elements are particularly well adapted to serve the purposes here described and obtain an efficient and accurate survey within the range of operating limits. The preferred embodiment shown here is not the only way in which the selected elements may be arranged, nor does it limit the evidently possible substitutes to only the elements shown. It is intended that this invention will be limited only by the scope of the appended claims.

I claim:

1. An internal tube wall calipering and recording device adapted to be passed through an extended length of tubing comprising a housing, a plurality of loading wheels mounted on said housing and extending outwardly therefrom adapted to frictionally engage the tubing being calipered and prevent rotation of said housing during calipering and recording, means for adjusting the position of said loading wheels diametrically of said housing for contact with the tubing so that the loading wheels will contact walls of different diameter tubing, a plurality of feelers mounted circumferentially about said housing, means for positioning said feelers outwardly for contact with the tubing wall and for positioning said feelers in a retracted position out of contact with the tubing wall, release mechanism for said positioning means to release the same from the feeler retracted position to the feeler contacting position, recording means including a chart and a stylus, actuating means for imparting feeler movement to said recording means to cause relative reciprocative movement between said stylus and chart, a proportioning mechanism connecting said feelers and said actuating means, and driving means for said recording means, said driving means including a clutch, disengaging means, variable transmission means, and a driving head adapted to frictionally engage the internal surface of said tubing.

2. An internal tube wall calipering and recording device adapted to be passed through an extended length of tubing comprising a housing, a plurality of loading wheels mounted on said housing and extending outwardly therefrom adapted to frictionally engage the tubing being calipered and prevent rotation of said housing during calipering and recording, means for adjusting the position of said loading wheels diametrically of said housing for contact with the tubing so that the loading wheels will contact walls of different diameter tubing, a plurality of feelers mounted circumferentially about said housing, means for positioning said feelers outwardly for contact with the tubing wall and for positioning said feelers in a retracted position out of contact with the tubing wall, release mechanism for said positioning means to release the same from the feeler-retracted position to the feeler-contacting position, recording means including a chart and a stylus, actuating means for imparting feeler movement to said recording means to cause relative reciprocative movement between said stylus and chart, a proportioning mechanism connecting said feelers and said actuating means, and driving means for said recording means.

3. In an internal tube wall calipering and recording device having a housing, calipering feelers urged outwardly from the housing, recording means including a relatively movable stylus and chart, the improvement comprising a plurality of loading wheels mounted on the housing and extending outwardly therefrom and adapted to frictionally engage the tube being calipered and prevent rotation of the housing during calipering and recording, means for positioning the feelers out of contact with the tube wall during non-calipering operation, release mechanism for said positioning means to permit the feelers to move outwardly into contact with the tube wall during calipering, means for simultaneously adjusting the diametrical position of the loading wheels and the feelers for operation in tubes of different diameters, means for transmitting movement from the feelers to the recording means, means connected to said transmitting means for proportioning the transmission of movement to the recording means in predetermined relation to the movement of the feelers, and driving means for rotating said chart and stylus simultaneously in the same direction and at different predetermined speeds.

4. In an internal tube wall calipering and recording device having a housing, calipering feelers extending outwardly from the housing, recording means including a relatively movable stylus and chart, driving means for said recording means, the improvement comprising a plurality of loading wheels mounted on the housing and extending outwardly therefrom and adapted to frictionally engage the tube being calipered and prevent rotation of the housing during calipering and recording, means for positioning the feelers out of contact with the tube wall during non-calipering operation, release mechanism for said positioning means to permit the feelers to move outwardly for contact with the tube wall during calipering, means for simultaneously adjusting the diametrical position of the loading wheels and the feelers for operation in tubes of different diameters, means for transmitting movement from the feelers to the recording means and means connected to said transmitting means for proportioning the transmission of movement to the recording means in predetermined relation to the movement of the feelers.

5. A device as set forth in claim 4 wherein said proportioning means amplifies the transmission of movement to the said transmitting means in predetermined relation to the movement of the feelers.

6. In an internal tube wall calipering and recording device having a housing, calipering feelers extending outwardly from the housing, recording means including a relatively movable stylus and chart, driving means for said recording means, the improvement comprising a plurality of loading wheels mounted on the housing and extending outwardly therefrom and adapted to frictionally engage the tube being calipered and prevent rotation of the housing during calipering and recording, means for positioning the feelers out of contact with the tube wall during non-calipering operation, release mechanism for said positioning means to permit the feelers to move outwardly into contact with the tube wall during calipering, means for simultaneously adjusting the diametrical position of the loading wheels and the feelers for operation in tubes of different diameters, a stylus actuating member, said feelers having portions thereof in contact with said stylus actuating member for transmitting movement thereto, independent resilient means for urging each of said feelers outwardly from said housing, and resilient positioning means for said stylus actuating member, said positioning means including a tube depending from said release mechanism and having a sliding connection with said stylus actuating member, a compression spring surrounding said tube for urging all of said portions of said feelers into contact with said stylus actuating member, and a tension spring opposed to said compression spring housed within said tube and having one end thereof secured to said stylus actuating member for urging said stylus actuating member into contact with said portions of said feeler members.

7. An internal tube wall calipering and recording device adapted to be passed through an extended length of tubing comprising a housing, a plurality of calipering feelers mounted circumferentially about said housing, recording means including relatively movable stylus and chart elements, one of said elements being mounted for reciprocative movement relative to the other element, driving means for said recording means, said feelers having portions thereof in operative engagement with said reciprocative element, independent resilient means for urging each of said feelers outwardly from said housing, resilient positioning means for said reciprocative element, said positioning means including a tension spring for suspending said reciprocative element and for urging said reciprocative element into operative engagement with said portions of said feelers, and also including a compression spring opposed to said tension spring for urging all of said portions of said feelers into operative engagement with said reciprocative element, a plurality of loading wheels mounted on the housing and extending outwardly therefrom and adapted to frictionally engage the tube being calipered and prevent rotation of the housing during calipering and recording, means for retracting the feelers out of contact with the tube wall during non-calipering operation, release mechanism for said retracting means to permit the feelers to move outwardly into contact with the tube wall during calipering and means for simultaneously adjusting the diametrical position of the loading wheels and the feelers for operation in tubes of different diameters.

8. In an internal tube wall calipering device having a housing, calipering feelers mounted circumferentially about the housing and having means for urging the same outwardly therefrom into contact with the tube being calipered, recording means, driving means for said recording means, the improvement comprising a plurality of loading wheels mounted on the housing and extending outwardly therefrom and adapted to frictionally engage the tube being calipered and prevent rotation of the housing during calipering and recording, means for positioning the feelers out of contact with the tube wall during non-calipering operation, release mechanism for said positioning means to permit the feelers to move outwardly into contact with the tube wall during calipering and means for simultaneously adjusting the diametrical position of the loading wheels and the feelers relative thereto for operation in tubes of different diameters.

9. An internal tube wall calipering and recording device adapted to be passed through an extended length of tubing comprising a housing, a plurality of calipering feelers mounted circumferentially about said housing, recording means including relatively movable stylus and chart elements, one of said elements being mounted for reciprocative movement relative to the other element, driving means for said recording means, said feelers having portions thereof in operative engagement with said reciprocative element, independent resilient means for urging each of said feelers outwardly from said housing, resilient positioning means for said reciprocative element, said positioning means including a tension spring for suspending said reciprocative element and for urging asid reciprocative element into operative engagement with said portions of said feelers, and also including a compression spring opposed to said tension spring for urging all of said portions of said feelers into operative engagement with said reciprocative element, a plurality of loading wheels mounted on the housing and extending outwardly therefrom and adapted to frictionally engage the tube being calipered and prevent rotation of the housing during calipering and recording, means for retracting the feelers out of contact with the tube wall during non-calipering operation, and release mechanism for said retracting means to permit the feelers to move outwardly into contact with the tube wall during calipering.

10. An internal tube wall calipering and recording device comprising a housing, recording means, a plurality of independently movable feelers mounted circumferentially about said housing, motion transmitting means interposed between said feelers and said recording means, variable means interposed in said transmitting means for changing the proportion of movement from said feelers to said recording means, means for positioning said feelers outwardly for contact with a tube wall of predetermined diameter and for suspending said movement transmitting means, and means for adjusting said positioning means for adjusting the feelers diametrically of said housing so that said feelers will contact the wall of a different diameter tube.

11. An internal tube wall calipering and recording device comprising a housing, calipering feelers mounted circumferentially about the housing and having means for urging the same outwardly therefrom into contact with the tube being calipered, means for positioning the feelers in a retracted position out of contact with the tube wall during non-calipering operation, release mechanism for said positioning means to permit the feelers to move outwardly and into contact with the tube wall during calipering, and means for adjusting said positioning means to adjust the retracted position of the feelers relative to the housing.

12. In an internal tube wall calipering and recording device having a housing, calipering feelers extending outwardly from the housing, recording means, driving means rotatable about the longitudinal axis of said housing for said recording means, the improvement comprising a plurality of loading wheels mounted on the housing and extending outwardly therefrom for frictionally engaging the tube being calipered to prevent rotation of the housing during calipering and recording, and means for adjusting the position of said loading wheels diametrically of said housing into contact with the tube so that the loading wheels will contact walls of different diameter tubes.

13. The device as set forth in claim 12 further characterized in that said means for adjusting the position of the loading wheels also adjusts the position of the feelers relative to the housing.

14. The device as set forth in claim 12 further characterized in that said recording means includes a stylus and a chart and that said means for adjusting the position of the loading wheels also adjusts the realtive position of said stylus and chart.

15. The device as set forth in claim 14 further characterized in that said means for adjusting the position of said loading wheels and relative position of said chart and stylus also adjusts the position of said feelers relative to said housing.

16. An internal tube wall calipering and recording device comprising a housing, calipering feelers extending outwardly from the housing, means for recording the movement of said feelers, driving means rotatable about the longitudinal axis of said housing for said recording means tending to rotate said housing, and a plurality of loading wheels mounted on the housing and extending outwardly therefrom and adapted to frictionally engage the tube being calipered and prevent rotation of the housing during calipering and recording.

17. An internal tube wall calipering and recording device adapted to be passed through an extended length of tubing comprising a housing, a plurality of calipering feelers mounted circumferentially about said housing, recording means including relatively movable stylus and chart elements, one of said elements being mounted for reciprocative movement relative to the other element, driving means for said recording means, said feelers having portions thereof in operative engagement with said reciprocative element, independent resilient means for urging each of said feelers outwardly from said housing, and resilient positioning means for suspending said reciprocative element, said positioning means including a compression spring mounted above said reciprocative element for urging all of said portions of said feelers into operative engagement with said reciprocative element and a tension spring positioned above said reciprocative element opposed to said compression spring for urging said reciprocative element into operative engagement with said portions of said feelers.

18. An internal tube wall calipering and recording device comprising a housing, recording means including a chart and a stylus, a plurality of feelers mounted circumferentially about said housing, means for positioning said feelers outwardly for contact with the tube wall of a predetermined diameter, means for adjusting said positioning means for adjusting the feelers diametrically of said housing so that said feelers will contact the wall of a different diameter tube, driving means for said recording means, said driving means including variable transmission means for driving said recording means at one speed when the feelers are adjusted for calipering a tube wall of a predetermined diameter and at a different speed when the feelers are adjusted for calipering the tube wall of a different diameter.

19. An internal tube wall calipering and recording device comprising a housing, a plurality of calipering feelers mounted circumferentially about said housing, recording means in said housing, means for transmitting movement from the feelers to the recording means, in combination with variable means interposed in said transmitting means for changing the proportion of movement from said feelers to the recording means, and resilient positioning means for urging said feelers outwardly into contact with a tube wall of predetermined diameter and for suspending said movement transmitting means, said positioning means including a compression spring mounted above said movement transmitting means for urging a portion of each of said feelers into operative engagement with said movement transmitting means and a tension spring positioned above said movement transmitting means opposed to said compression spring for urging said movement transmitting means into operative engagement with said portion of said feelers.

20. An internal tube wall calipering and recording device comprising a housing, a plurality of calipering feelers mounted circumferentially about said housing, recording means, means for transmitting movement from the feelers to the recording means, in combination with variable means interposed in said transmitting means for changing the proportion of movement from said feelers to said recording means, and driving means for said recording means, said driving means including variable transmission means for changing the driving speed of said recording means.

21. In an internal tube wall calipering and recording device adapted to be passed through an extended length of tubing comprising a housing, a plurality of calipering feelers mounted circumferentially about the housing, recording means including a stylus, a stylus actuating member, said feelers having portions thereof in operative engagement with said stylus actuating member, independent resilient means for urging each of the feelers outwardly from said housing, and resilient positioning means for suspending said stylus actuating member, said positioning means including a compression spring mounted above said stylus actuating member for urging all of the said portions of said feelers into operative engagement with said stylus actuating member and a tension spring mounted above said stylus actuating member opposed to said compression spring for urging the said stylus actuating member into operative engagement with said portions of said feelers.

22. An internal tube wall calipering and recording device comprising a housing, recording means, a plurality of independently movable feelers mounted circumferentially about said housing, means for positioning said feelers outwardly for contact with a tube wall of predetermined diameter, means for adjusting said positioning means for adjusting the feelers diametrically of said housing so that said feelers will contact the wall of a different diameter tube, motion transmitting means interposed between said feelers and said recording means, and variable means interposed in said transmitting means for changing the proportion of movement from said feelers to said recording means.

23. An internal tube wall calipering and recording device comprising a housing, recording means, a plurality of independently movable feelers mounted circumferentially about said housing, means for positioning said feelers outwardly for contact with a tube wall of predetermined diameter, means for adjusting said positioning means for adjusting the feelers diametrically of said housing so that said feelers will contact the wall of a different diameter tubing, motion transmitting means interposed between said feelers and said recording means, variable means interposed in said transmitting means for changing the proportion of movement from said feelers to said recording means, and driving means for said recording means, said driving means including variable transmission means for driving said recording means at one speed when the feelers are adjusted for calipering a tube wall of predetermined diameter and at a different speed when the feelers are adjusted for calipering a tube wall of different diameter.

24. An internal tube wall calipering and recording device comprising a housing, recording means, a plurality of independently movable feelers mounted circumferentially about said housing, motion transmitting means interposed between said feelers and said recording means, variable means interposed in said transmitting means for changing the proportion of movement from said feelers to said recording means, means for positioning said feelers outwardly for contact with a tube wall of predetermined diameter and for suspending said movement transmitting means, and means for adjusting said positioning means for adjusting the feelers diametrically of said housing so that said feelers will contact the wall of a different diameter tube, said positioning means including a compression spring mounted above said motion transmitting means for urging a portion of each of said feelers into operative engagement with said motion transmitting means, and a tension spring positioned above said motion transmitting means opposed to said compression spring for urging said motion transmitting means into operative engagement with said portions of said feelers, and driving means for said recording means, said driving means including variable transmission means for driving said recording means at one speed when the feelers are adjusted for calipering a tube wall of predetermined diameter and at a different speed when the feelers are adjusted to caliper the wall of a different diameter tube.

25. An internal tube wall calipering and recording device comprising a housing, recording means, a plurality of independently movable feelers mounted circumferentially about said housing, motion transmitting means interposed between said feelers and said recording means, variable means interposed in said transmitting means for changing the proportion of movement from said feelers to said recording means, means for positioning said feelers outwardly for contact with a tube wall of predetermined diameter and for suspending said movement transmitting means, and means for adjusting said positioning means for adjusting the feelers diametrically of said housing so that said feelers will contact the wall of a different diameter tube, and driving means for said recording means, said driving means including variable transmission means for driving said recording means at one speed when the feelers are adjusted for calipering a tube wall of predetermined diameter and at a different speed when the feelers are adjusted to caliper the wall of a different diameter tube.

26. An internal tube wall calipering and recording device comprising a housing, recording means, a plurality of independently movable feelers mounted circumferentially about said housing, motion transmitting means interposed between said feelers and said recording means, variable means interposed in said transmitting means for changing the proportion of movement from said feelers to said recording means, means for positioning said feelers outwardly for contact with a tube wall of predtermined diameter and for suspending said movement transmitting means, and means for adjusting said positioning means for adjusting the feelers diametrically of said housing so that said feelers will contact the wall of a different diameter tube, said positioning means including a compression spring mounted above said motion transmission means for urging a portion of each of said feelers into operative engagement with said motion transmitting means, and a tension spring positioned above said motion transmitting means opposed to said compression spring for urging said motion transmitting means into operative engagement with said portions of said feelers.

27. An internal tube wall calipering and recording device comprising a housing, recording means, a plurality of independently movable feelers mounted circumferentially about said housing, motion transmitting means interposed between said feelers and said recording means, variable means interposed in said transmitting means for changing the proportion of movement from said feelers to said recording means, and means for positioning said feelers outwardly for contact with the tube wall, said positioning means including a compression spring mounted above said motion transmission means for urging a portion of each of said feelers into operative engagement with said motion transmitting means, and a tension spring positioned above said motion transmitting means opposed to said compression spring for urging said motion transmitting means into operative engagement with said portions of said feelers.

28. An internal tube wall calipering and recording device comprising a housing, recording means, a plurality of independently movable feelers mounted circumferentially about said housing, motion transmitting means interposed between said feelers and said recording means, variable means interposed in said transmitting means for changing the proportion of movement from said feelers to said recording means, means for positioning said feelers outwardly for contact with the tubing wall of a predetermined diameter and for suspending said movement transmitting means, means for adjusting said positioning means for adjusting the feelers diametrically of said housing so that said feelers will contact the wall of a different diameter tubing, means for retracting the feelers out of contact with the tube wall during non-calipering operation, and release mechanism for said retraction means to release the feelers from retracted position to tube wall contact position during calipering.

29. An internal tube wall calipering and recording device comprising a housing, a plurality of calipering feelers mounted circumferentially about said housing, recording means in said housing, means for transmitting movement from the feelers to the recording means, in combination with variable means interposed in said transmitting means for changing the proportion of movement from said feelers to the recording means, and resilient positioning means for suspending said movement transmitting means, said positioning means including a compression spring mounted above said movement transmitting means for urging a portion of each of said feelers into operative engagement with said movement transmitting means and a tension spring positioned above said movement transmitting means opposed to said compression spring for urging said movement transmitting means into operative engagement with said portions of said feelers.

30. An internal tube wall calipering and recording device comprising a housing, a plurality of calipering feelers extending around the periphery of and outwardly from the housing, recording means in said housing, means for transmitting movement from the feelers to the recording means, in combination with variable means interposed in said transmitting means changing the proportion of movement from said feelers to the recording means.

31. In an internal tube wall calipering and recording device having a housing, a plurality of independently movable calipering feelers around the periphery of and extending outwardly from the housing, and recording means in said housing, the improvement which comprises means in operating engagement with and responsive to the movement of each of the feelers, reciprocative means connected to the recording means, and common proportioning means interposed therebetween to transmit individual feeler movement from said responsive means to the reciprocative means in predetermined relation to the individual movement of the feelers.

32. In an internal tube wall calipering and recording device having a housing, a plurality of calipering feelers extending around the periphery of and outwardly from the housing, and recording means, the improvement which comprises means for transmitting movement from the feelers to the recording means and changeable means connected to said transmitting means for amplifying the transmission of movement to the recording means in predetermined relation to the movement of the feelers.

33. A device as set forth in claim 32 further characterized in that the recording means includes a chart and a stylus, and said movement transmitting means includes a stylus actuating rod and wherein said amplifying means is interposed between said rod and said movement transmitting means and includes a fixed rack, a rack on said rod opposing said fixed rack and a gear secured to said amplifying means interposed between said racks.

34. A device as set forth in claim 32 further characterized in that the recording means includes a chart and a stylus and said movement transmitting means includes a stylus actuating rod and a member reciprocably mounted to receive the movement of the feelers, and said amplifying means includes a fixed rack, a rack on said stylus rod opposing said fixed rack and a gear carried by said member interposed between said racks.

35. A device as set forth in claim 33 further characterized in that said amplifying means further includes means for maintaining said gear in meshed engagement with said racks.

36. An internal tube calipering and recording device adapted to pass through an extended length of tubing comprising a housing, a plurality of calipering feelers mounted circumferentially about said housing, recording means including a chart and stylus, a lead screw for said stylus concentrically mounted in said housing and fixed against rotation, and driving means for rotating said chart and stylus simultaneously in the same direction and at different predetermined speeds.

References Cited in the file of this patent

UNITED STATES PATENTS

| | | |
|---|---|---|
| 1,257,483 | Hart et al. | Feb. 26, 1918 |
| 1,329,456 | Carpenter | Feb. 3, 1920 |
| 1,924,071 | Laudermilk | Aug. 22, 1933 |
| 2,150,070 | Kregecz | Mar. 7, 1939 |
| 2,251,040 | Dewees | July 29, 1941 |
| 2,292,113 | Floyd | Aug. 4, 1942 |
| 2,518,663 | Chaney et al. | Aug. 15, 1950 |
| 2,544,609 | McMahan | Mar. 6, 1951 |
| 2,567,548 | Chaney et al. | Sept. 11, 1951 |
| 2,578,236 | Fredd | Dec. 11, 1951 |
| 2,600,847 | Church | June 17, 1952 |

UNITED STATES PATENT OFFICE

Certificate of Correction

Patent No. 2,708,316 May 17, 1955

John V. Fredd

It is hereby certified that error appears in the above numbered patent requiring correction and that the said Letters Patent should read as corrected below.

In the drawings, the sheet containing Fig. 11-A, as shown below should be inserted as Sheet 6 of the Letters Patent:

May 17, 1955 J. V. FREDD 2,708,316

TUBING CALIPER

Filed July 2, 1951 7 Sheets-Sheet 6

Fig. 11A

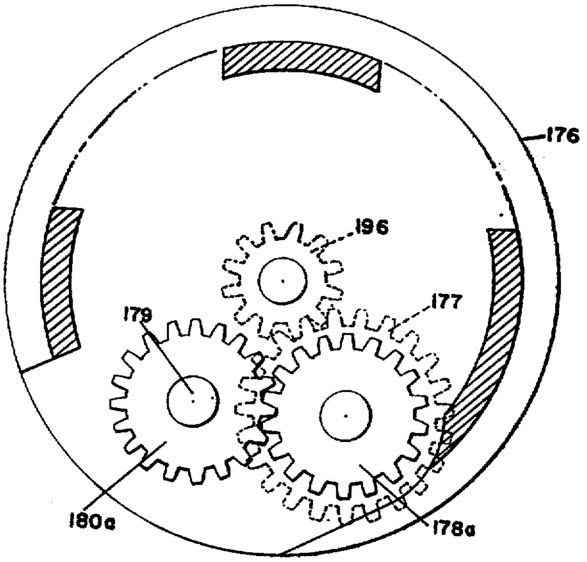

INVENTOR
JOHN V. FREDD

BY Bosser and Harding
ATTORNEYS in the heading to the printed Sheet 1 of the drawings, as it appears in the patent, line 3, for "6 Sheets—Sheet 1" read —7 Sheets—Sheet 1—; Sheet 2, line 3, for "6 Sheets—Sheet 2" read —7 Sheets—Sheet 2—; Sheet 3, line 3, for "6 Sheets—Sheet 3" read —7 Sheets—Sheet 3—; Sheet 4, line 3, for "6 Sheets—Sheet 4" read —7 Sheets—Sheet 4—; Sheet 5, line 3, for "6 Sheets—

Sheet 5" read —7 Sheets—Sheet 5—; Sheet 6, line 3, for "6 Sheets—Sheet 6" read —7 Sheets—Sheet 7—.

Signed and sealed this 31st day of December 1957.

[SEAL]

Attest:

KARL H. AXLINE,
*Attesting Officer.*

ROBERT C. WATSON,
*Commissioner of Patents.*